(12) United States Patent
Castelain et al.

(10) Patent No.: US 7,333,538 B2
(45) Date of Patent: Feb. 19, 2008

(54) EQUALISATION METHOD AND DEVICE OF THE GMMSE TYPE

(75) Inventors: Damien Castelain, Rennes (FR); David Mottier, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 789 days.

(21) Appl. No.: 10/100,095

(22) Filed: Mar. 19, 2002

(65) Prior Publication Data

US 2003/0039302 A1    Feb. 27, 2003

(30) Foreign Application Priority Data

Mar. 22, 2001 (FR) ................................. 01 04051

(51) Int. Cl.
    *H03H 7/30* (2006.01)
(52) U.S. Cl. ...................... 375/229; 375/233
(58) Field of Classification Search ................ 375/233, 375/341, 229; 333/12; 708/300, 819
    See application file for complete search history.

(56) References Cited

U.S. PATENT DOCUMENTS

| 6,810,096 B1 * | 10/2004 | Saito et al. ................. 375/341 |
| 6,829,307 B1 * | 12/2004 | Hoo et al. ................... 375/260 |
| 6,965,638 B2 * | 11/2005 | Warke ......................... 375/222 |
| 6,980,602 B1 * | 12/2005 | Kleinerman et al. ......... 375/262 |

OTHER PUBLICATIONS

Krauss et al. MMSE Equalization for Forward Link in 3G CDMA: Symbol Level Versus Chip Level, Aug. 2000.*
J.-F. Hélard, et al., Electronic Letters, vol. 36, No. 7, pp. 665-666, XP-006015082, "Linear MMSE Detection Technique for MC-CDMA", Mar. 30, 2000.
A. J. Voorman, et al., IEEE International Symposium on Personal, Indoor, and Mobile Radio Communications, pp. 228-232, XP-002186690, "Performance Evaluation of the Decorrelating Detector for DS-CDMA Systems Over Multi-Path Rayleigh Fading Channels With AWGN", Sep. 8-11, 1998.
D. Mottier, et al., IEEE Vehicular Technology Conference, vol. 3, pp. 1270-1275, XP-002186691, "A Spreading Sequence Allocation Procedure for MC-CDMA Transmission Systems", Sep. 24-28, 2000.
S. Das et al., IEEE International Symposium on Personal, Indoor, and Mobile Radio Communications, pp. 62-67, XP-002186693, "Computationally Efficient Multiuser Detectors", Sep. 1-4, 1997.

* cited by examiner

*Primary Examiner*—Chieh M. Fan
*Assistant Examiner*—Jaison Joseph
(74) *Attorney, Agent, or Firm*—Oblon, Spivak, McClelland, Maier & Neustadt, P.C.

(57) ABSTRACT

An equalization method for a downlink channel in an MC-CDMA telecommunication system includes a plurality of links established between a transmitter and a plurality of receivers, each link using a distinct access code amongst N possible codes. The method includes a first step of estimating the relative levels of the signals transmitted by the transmitter using each of the N codes, the first step including an equalization of the MC-CDMA symbols carrier by carrier, and a second step using the levels for estimating the symbols transmitted by the user over at least one link, the second step being adapted to minimize the mean square error between the transmitted symbols and the estimated symbols.

28 Claims, 6 Drawing Sheets

EQUALISATION METHOD AND DEVICE OF THE GMMSE TYPE

BACKGROUND OF THE INVENTION

1. Field of the Invention

The present invention concerns an equalisation method and device for the downlink channel of a telecommunications system of the MC-CDMA type. More particularly, the present invention concerns an equalisation method and device of the GMMSE type.

2. Discussion of Background

Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109-113, 1993. The developments of this technique were reviewed by S. Hara et al. in the article entitled "Overview of Multicarrier CDMA" published in IEEE Communication Magazine, pages 126-133, December 1997.

Unlike the DS-CDMA (Direct Sequence Code Division Multiple Access) method, in which the signal of each user is multiplied in the time domain in order to spread its frequency spectrum, the signature here multiplies the signal in the frequency domain, each element of the signature multiplying the signal of a different sub-carrier.

Figure 1:
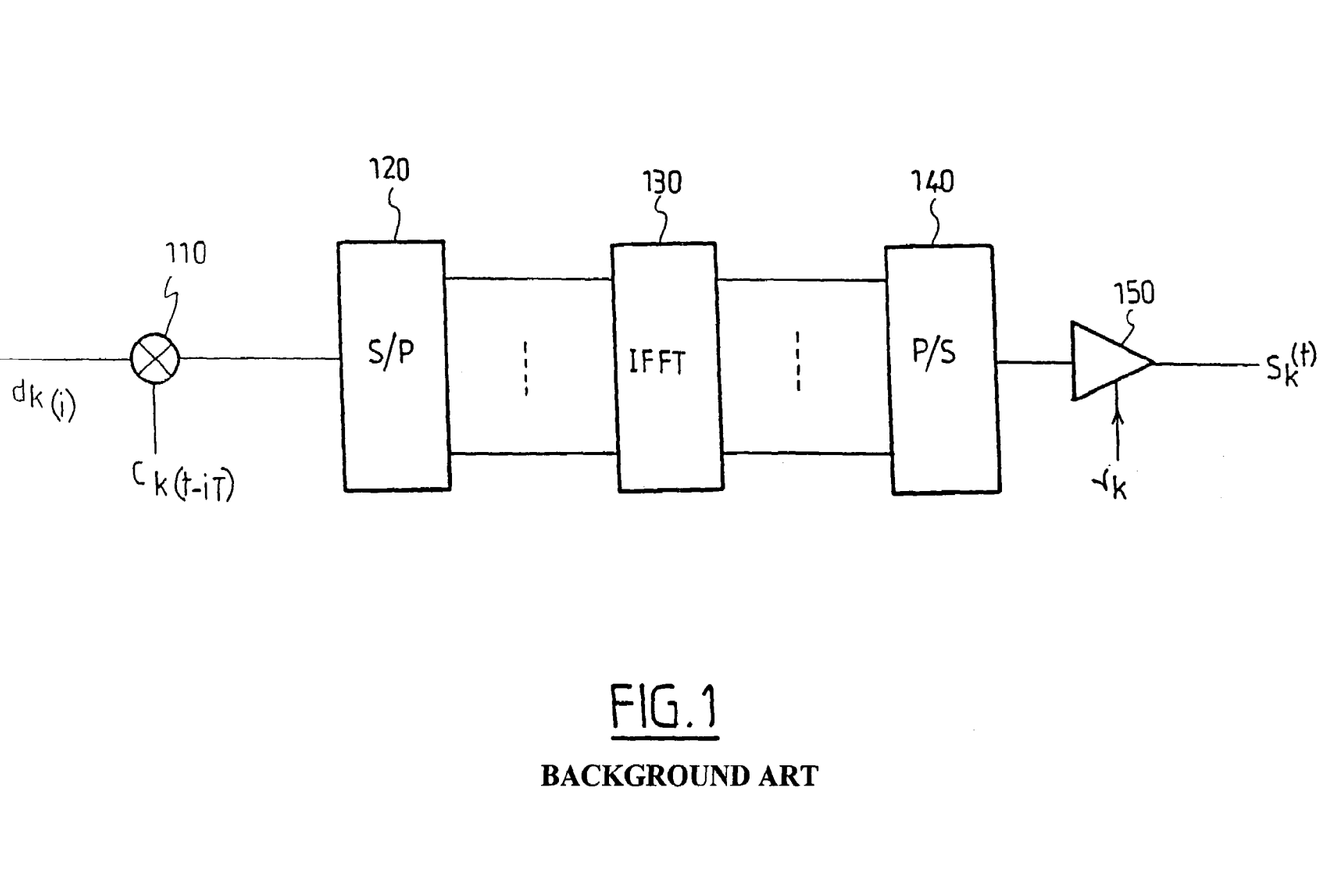
FIG. 1 depicts schematically the structure of an MC-CDMA transmitter known from the state of the art.

More precisely, FIG. 1 shows the structure of an MC-CDMA transmitter for a given user k. Let $d_k(i)$ be the $i^{th}$ symbol to be transmitted from the user k, where $d_k(i)$ belongs to the modulation alphabet. The symbol $d_k(i)$ is first of all multiplied at 110 by a spreading sequence or signature of the user, denoted $c_k(t)$, consisting of N "chips", each "chip" being of duration $T_c$, the total duration of the spreading sequence corresponding to a symbol period T. The results of the multiplication of the symbol $d_k(i)$ by the different "chips" are converted by the serial to parallel converter 120 into a block of L symbols, where L is in general a multiple of N. It will be considered, for reasons of simplification of presentation, that L=N. The block of L symbols is then subjected to an inverse fast Fourier transformation (IFFT) in the module 130 before being transmitted to the parallel to serial converter 140. In order to prevent intersymbol interference, a guard interval, with a length greater than the duration of the pulse-type response of the transmission channel, is added to the MC-CDMA symbol. This interval is obtained by the addition (not shown) of a suffix chosen so as to be identical to the start of the said symbol. The symbol thus obtained is amplified at 150 in order to be transmitted over the user channel. It can therefore be seen that the MC-CDMA method can be analysed into a spreading in the spectral domain (before IFFT) followed by an OFDM modulation.

In practice, the user k transmits his data in the form of frames of I symbols, each symbol $d_k(i)$ being spread by a real signature $c_k(t)$ with a duration equal to the symbol period T, such that $c_k(t)=0$ if $t \notin [0,T]$. The signal modulated at time $t=i.T+l.T_c$ can then be written, if the guard intervals between MC-CDMA symbols are omitted:

$$S_k(t) = \sum_{i=0}^{l-1}\sum_{l=0}^{L-1} v_k \cdot c_k(l \cdot T_c) \cdot d_k(i) \cdot \exp(j \cdot 2\pi l/L) \quad (1)$$

where $v_k$ is the amplitude of the signal transmitted by the user k, assumed to be constant for a transmission unit.

Figure 2:
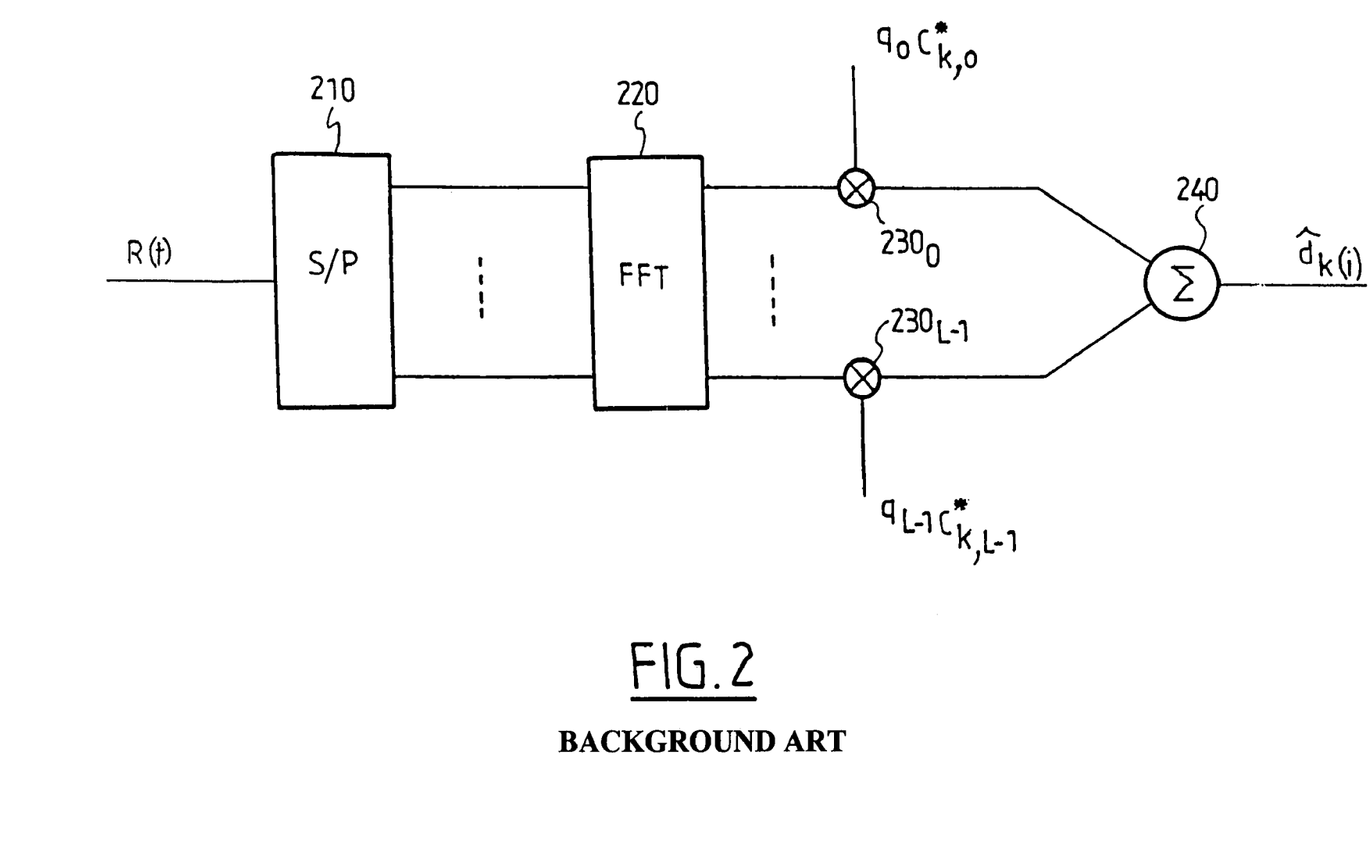
FIG. 2 depicts schematically the structure of a single user MC-CDMA receiver known from the state of the art.

An MC-CDMA receiver for a given user k has been illustrated schematically in FIG. 2.

The demodulated received signal is sampled at the "chip" frequency and the samples belonging to the guard interval are eliminated (elimination not shown). The signal obtained can be written:

$$R(t) = \sum_{k=0}^{K-1}\sum_{i=0}^{l-1}\sum_{l=0}^{L-1} h_{kl}(i) \cdot v_k \cdot c_{kl} \cdot d_k(i) \cdot \exp(j \cdot 2\pi l/L) + b(t) \quad (2)$$

where K is the number of users, $c_{kl}=c_k(l.T_c)$, $h_{kl}(i)$ represents the response of the channel of the user k to the frequency of the subcarrier l of the MC-CDMA symbol transmitted at time i.T and where b(t) is the received noise.

If the downlink channel is considered, the transmission channels have identical characteristics and it is possible to write $h_{kl}=h_l$. The study will be limited hereinafter to the downlink channel.

The samples obtained by sampling at the "chip" frequency are put in parallel in a serial to parallel converter 210 before undergoing an FFT in the module 220. The samples in the frequency domain, output from 220, are equalised and despread by the signature of the user k. To do this, the samples of the frequency domain are multiplied by the coefficients $q_l.c^*_{kl}$ in the multipliers $230_0, \ldots, 230_{L-1}$, and then added at 240 in order to supply as an output an estimated symbol $\hat{d}_k(i)$.

Different possibilities of equalisation have been envisaged in the state of the art:
- MRC (Maximum Ratio Combining) defined by the use of the coefficients $q_l=h^*_l$ where .* denotes the complex conjugate;
- EGC (Equal Gain Combining) defined by the use of the coefficients $q_l=e^{-j\phi_l}$ where $h_l=\rho_l.e^{j\phi_l}$;
- ZF (Zero Forcing) where $q_l=h_l^{-1}(i)$;
- zero forcing ZF with threshold (Th) where $q_l=h_l^{-1}(i)$ if $|h_l(i)|<Th$ and $q_l=0$ (or $q_l=e^{-j\phi_l}$) otherwise;
- the Minimum Mean Square Error (MMSE) algorithm for minimising the mean square error on each of the carriers:

$$q_l = \frac{h_l^*}{|h_l|^2 + \sigma^2}$$

where $\sigma^2$ is the variance of the noise on the carrier.

In MC-CDMA, the presence of a guard period makes it possible to neglect the intersymbol interference. The equalisation can therefore be carried out by means of a simple multiplication by a complex coefficient, carrier by carrier.

The receiver illustrated in FIG. 2 decodes the data of a user k without taking account of the interference due to the other users. For this reason it is known as single user or SU.

The multiuser detection techniques are known notably in CDMA telecommunications systems. They have the common characteristic of taking account of the interference generated by the other users.

A multiuser detection or MUD technique for MC-CDMA was presented in the article by J-Y. Beaudais, J. F. Hèlard and J. Citerne entitled "A novel linear MMSE detection technique for MC-CDMA" published in Electronics Letters, Vol. 36, N° 7, pages 665-666, 30 Mar. 2000. The equalisation method proposed no longer operates carrier by carrier but MC-CDMA symbol by MC-CDMA symbol, taking account of all the carriers. For this reason it is called GMMSE (Global Minimum Mean Square Error) equalisation or, equivalently, M-MMSE (Matrix Minimum Mean Square Error) equalisation. Its purpose is to minimise the mean square error between the estimated symbols $\hat{d}_k(i)$ and the transmitted symbols $d_k(i)$.

Figure 3:
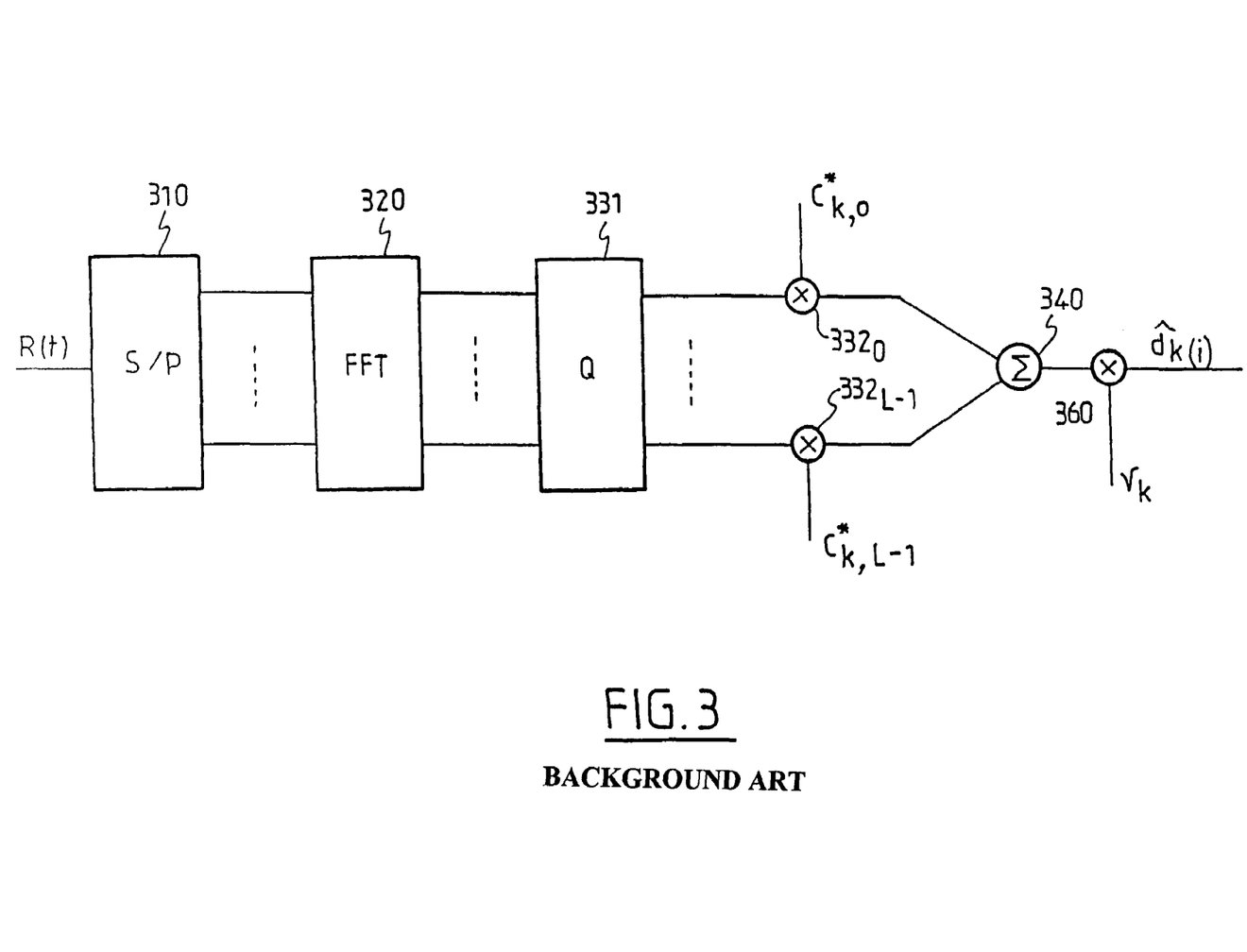
FIG. 3 depicts schematically the structure of an MC-CDMA receiver using a GMMSE equalisation, known from the state of the art.

An MC-CDMA receiver with GMMSE equalisation for a user k (also referred to in this case as per user MMSE) has been shown in FIG. 3. It differs from that of FIG. 2 in that the equalisation is effected by means of a multiplication 331 by a matrix Q of the signals of the different carriers. The despread signal obtained at the output of the adder 340 is then multiplied by the transmission level $v_k$ of the user k in question in order to supply an estimated symbol $\hat{d}_k(i)$.

As shown in the aforementioned article, the matrix Q can be obtained by applying the Wiener filtering theory, in the form:

$$Q = H^H (AA^H + \sigma_b^2 \cdot I_N)^{-1} \quad (3)$$

with A=HCV where H is the diagonal matrix N×N representing the frequency response of the channel, C is the matrix N×N whose columns are the code sequences of the different users (which will hereinafter simply be referred to as "codes"), V is the diagonal matrix N×N whose elements $v_i$ are the transmission levels of the different users, $\sigma_b^2$ is the variance of the noise and $I_N$ is the identity matrix of size N×N. The symbol $.^H$ designates the conjugate transpose. It should be noted that, in general, matrix inversion is not carried out but the corresponding system of linear equations is resolved.

SUMMARY OF THE INVENTION

As has just been seen, the GMMSE equalisation method assumes that the matrix V is known, that is to say the transmitted levels of the different users. However, a mobile terminal does not know the transmission powers of the signals transmitted by the base station intended for the different users nor even the codes which are actually used. The developments of the state of the art generally assume that the transmission levels are known, which is not the case in practice. In addition, formula (3) requires an inversion of a matrix of size N, equal to the length of the spreading sequence and to the maximum value of the number of users (or equivalently the resolution of a system of N linear equations). Thus, even if the system is working at low load, the complexity of the equalisation operation always remains high.

The aim of the present invention is to propose a GMMSE equalisation method for a downlink channel in an MC-CDMA telecommunication system which makes it possible to estimate the different transmission levels intended for the different users and which is of reduced complexity, notably when the system is not working at full load.

To this end, the present invention is defined by an equalisation method for a downlink channel in an MC-CDMA telecommunication system in which a plurality of links are established between a transmitter and a plurality of receivers, each link using a distinct access code amongst N possible codes, characterised in that it comprises a first step of estimating the relative levels ($\hat{v}_i$) of the signals transmitted by the transmitter by means of each of the said N codes, the said first step including an equalisation of the MC-CDMA symbols carrier by carrier, and a second step using the said levels for estimating the symbols transmitted by the user over at least one link, the said second step being adapted to minimise the mean square error between the said transmitted symbols and the estimated symbols.

Advantageously, the carrier by carrier equalisation of the MC-CDMA symbols is followed by a filtering adapted to each of the N possible codes. The N values obtained by filtering adapted to each of the N possible codes will then be subjected to a modulus calculation giving the estimation of the said levels. A time smoothing operation can be provided prior to or subsequent to that of calculating the modulus.

According to one embodiment, the second step is adapted to calculate:

$$\hat{D} = (\hat{A}^H \hat{A} + \sigma_b^2 \cdot I_N)^{-1} \hat{A}^H Y$$

where $\hat{D}$ is the vector of the estimated symbols on the different links, Y is the received vector of the components of an MC-CDMA symbol on the different carriers, $\hat{A} = HC\hat{V}$ with H the matrix giving the characteristics of the transmission channel at these different carrier frequencies, C is the matrix of the N codes, $\hat{V} = \text{Diag}(\hat{v}_0, \ldots, \hat{v}_{N-1})$ where the $\hat{v}_i$ values are the transmission levels estimated by the first step, $\sigma_b^2$ is the variance of the noise on each carrier and $I_N$ the unity matrix of size N×N.

Advantageously, the carrier by carrier equalisation of the first step is an MRC equalisation. In this case, and according to a second embodiment, the second step is adapted to calculate:

$$\hat{D} = (\hat{A}^H \hat{A} + \sigma_b^2 \cdot I_N)^{-1} \hat{V}^H Z$$

where $\hat{D}$ is the vector of the symbols estimated on the different links, Z represents the output of the adapted filtering of the first step, $\hat{A} = HC\hat{V}$ with H a matrix giving the transmission characteristics of the transmission channel at the different carrier frequencies, C is the matrix of the N codes, $\hat{V} = \text{Diag}(\hat{v}_0, \ldots, \hat{v}_{N-1})$ where the $\hat{v}_i$ values are the transmission levels estimated by the first step, $\sigma_b^2$ is the variance of the noise on each carrier and $I_N$ the unity matrix of size N×N.

If the components of the matrix of the codes C satisfy an equation of the type $c^*_{k,i} c_{k,j} = \lambda_{ij} c_{k,f(i,j)}$ or $\lambda_{ij} c^*_{k,f(i,j)}$ where $\lambda_{ij}$ is a complex number and $f(i,j)$ is an index between 0 and N-1 dependent on i and j, in particular if the codes are Walsh-Hadamard, rotated Walsh-Hadamard, Fourier or rotated Fourier codes, the matrix $\hat{A}^H \hat{A}$ can be obtained from the matrix $B = C^H |H|^2 C$ and the latter can itself be obtained by first of all calculating one of its rows/columns and deriving therefrom the other rows/columns by means of a permutation of its elements.

According to a variant, a subset of codes amongst the N possible codes will be selected from the N estimated levels ($\hat{v}_i$). The selection can be carried out by retaining, amongst the N estimated levels ($\hat{v}_i$), those which exceed a predetermined threshold value Th. Alternatively, for a given link k using a code $c_k$ and having a transmission level $\hat{v}_k$, a selection is made of the codes $c_m$ associated with transmission levels $\hat{v}_m$ such that $\hat{v}_m > \mu \cdot \hat{v}_k$ with $0 < \mu < 1$. The threshold value Th or $\mu$ will advantageously be determined as a function of the ratio between the number of codes actually used and the number N of possible codes. In addition, for a given link k using a code $c_k$, it is possible finally to retain, amongst the codes selected, only those which are most able to jam it. The codes $c_i$ most able to jam the code $c_k$ will advantageously be obtained from a property of the sequence produced defined by $w_{ik}[l]=c_{l,i}\cdot c^*_{l,k}$ where $c_{l,i}$ and $c_{l,k}$ are the sequences associated with the codes $c_j$ and $c_k$ respectively. If the codes satisfy an equation of the type $c_{l,i}\cdot c^*_{l,k}=\lambda_{ik} c_{l,f(i,k)}$ or $\lambda_{ik} c^*_{l,f(i,k)}$ where $\lambda_{ik}$ is a complex number and $f(i,k)$ is an index which is a function of i and k, the codes most able to jam the code $C_k$ can be obtained from the codes most able to jam a predetermined code $c_0$.

If P codes amongst N have been selected as indicated above, the matrix $\hat{V}=\text{Diag}(\hat{v}_0, \ldots, \hat{v}_{N-1})$, where the $\hat{v}_i$ values are the transmission levels estimated by the first step, can be reduced to a matrix $\hat{V}'$ of size P×P now including only the levels associated with the said selected codes, the second step then being adapted to calculate:

$$\hat{D}'=(\hat{A}'^H \hat{A}' + \sigma_b^2 \cdot I_P)^{-1} \hat{A}'^H Y$$

where $\hat{D}'$ is the vector of the estimated symbols on the links relating to the selected codes, $\hat{A}'=HC'\hat{V}'$ where H is the matrix giving the characteristics of the transmission channel at the different carrier frequencies, C' is the matrix of the P codes selected, Y is the received vector of the components of the MC-CDMA symbol on the different carriers, $\sigma_b^2$ is the variance of the noise on each carrier and $I_P$ the unity matrix of size P×P.

Advantageously, the carrier by carrier equalisation of the first step is an MRC equalisation. In this case, if P codes amongst N have been selected as indicated above, the matrix $\hat{V}=\text{Diag}(\hat{v}_0, \ldots, \hat{v}_{N-1})$, where the $\hat{v}_i$ values are the transmission levels estimated by the first step, can be reduced to a matrix $\hat{V}'$ of size P×P now containing only the levels associated with the said selected codes, the second step then being adapted to calculate:

$$\hat{D}'=(\hat{A}'^H \hat{A}' + \sigma_b^2 \cdot I_P)^{-1} \hat{V}'^H Z'$$

where $\hat{A}'=HC'\hat{V}'$, H is the matrix giving the characteristics of the transmission channel at the different carrier frequencies, C' is the matrix of the P codes selected, Z' represents the output of the adapted filtering of the first step, reduced to the P codes selected, $\sigma_b^2$ is the variance of the noise on each carrier and $I_P$ the unity matrix of size P×P. The matrix $\hat{A}'^H \hat{A}'$ can be obtained from the matrix product $C'^H|H|^2 C'$ or from the matrix product $(C^H|H|^2 C)'$ where $(C^H|H|^2 C)'$ is a version reduced to the selected codes of the matrix $C^H|H|^2 C$, the choice of the first or of the second calculation method depending on the number of codes selected. If the matrix C of the codes is such that $c^*_{k,i} c_{k,j}=\lambda_{ij} c_{k,f(i,j)}$ or $\lambda_{ij} c^*_{k,f(i,j)}$ where $\lambda_{ij}$ is a complex number, where $f(i,j)$ is an index between 0 and N-1 dependent on i and j, the matrix $C^H|H|^2 C$ can be obtained by first of all calculating a first row/column of the said matrix and deriving the others from the said first row/column by means of a permutation of its elements. If the matrix C is a Hadamard or rotated Hadamard matrix, the said first row of $C^H|H|^2 C$ will be calculated by means of a Hadamard transform. Likewise, if the matrix C is a Fourier or rotated Fourier matrix, the first row of $C^H|H|^2 C$ will be calculated by means of a Fourier transform. The matrix $\hat{A}'^H \hat{A}'$ will be obtained from the matrix product $C'^H|H|^2 C'$ if the number of codes selected is less than $\log_2(N)$ and from the matrix product $(C^H|H|^2 C)'$ otherwise.

The invention is also defined by a telecommunication system receiver of the MC-CDMA type, comprising means for implementing the equalisation method as disclosed above.

Finally, the invention concerns a receiver for a telecommunication system of the MC-CDMA type, comprising such an equalisation device.

BRIEF DESCRIPTION OF THE DRAWINGS

The characteristics of the invention mentioned above, as well as others, will emerge more clearly from a reading of the following description given in relation to the accompanying figures, amongst which.

DESCRIPTION OF THE PREFERRED EMBODIMENTS

Once again the context of an MC-CDMA system using a GMMSE equalisation method will be referred to. The MC-CDMA signal after the FFT step (that is to say the signal output from the module 320 of FIG. 3) can be written in the form of a vector Y of dimension N whose components correspond to the different carriers. Taking the above notations again (but omitting, for reasons of simplification, the time index i), it is possible to express Y as a function of the vector D of the symbols $d_k$ transmitted to the different users:

$$Y=HCVD+b=AD+b \quad (4)$$

where $A=HCV$ and where b is the vector of the noise components.

More precisely, $D=(d_0, \ldots, d_{N-1})^T$ represents the vector of the symbols transmitted to the different users. The diagonal matrix $V=\text{Diag}(v_0, \ldots, v_{N-1})$ represents the levels transmitted. The matrix C corresponds to the code sequences transmitted. The $i^{th}$ column of C corresponds to the $i^{th}$ code sequence. For example, this matrix may be a Walsh-Hadamard or Fourier matrix, for which a fast transform algorithm exists. The diagonal matrix H represents the frequency response of the channel to the different subcarrier frequencies, that is to say $H=\text{Diag}(h_0, h_1, \ldots, h_{N-1})$. It will be assumed hereinafter that this matrix is known. Techniques exist for estimating the frequency response matrix, for example relying on the insertion of reference pilots, as described in the French application N° 0011834 filed on 14 Sep. 2000 in the name of the applicant and included here by reference.

When the system is not under full load, that is to say when the system has only a number P<N of users, it is possible to reduce the size of the vectors and matrices participating in equation (4). Indeed, it is possible to assume, without loss of generality, that these P users are the first P users: 0, ..., P-1. It is concluded from this that $d_i=0$ for $i>P-1$. Let D' be the vector reduced to the non-zero data: $D'=(d_0, \ldots, d_{P-1})^T$. Likewise the levels $v_i$ are zero for $i>P-1$. Likewise it is possible to define a reduced matrix $V'=\mathrm{Diag}(v_0, \ldots, v_{P-1})$.

If the P used codes of the users are known, the matrix C can also be reduced to a matrix C' of size N×P containing only the codes used. In this case, the matrix A, the product of the matrices H,C and V, is also reduced to a matrix A' of size N×P: $A'=HC'V'$. The vector Y is then written: $Y=A'D'+b$.

On reception the vector Y is the subject of the GMMSE equalisation for the matrix Q given by (3). If $\hat{D}$ is the vector of the estimated symbols for the different users, obtained by despreading:

$$\hat{D}=V^H C^H QY = A^H(AA^H + \sigma_b^2 \cdot I_N)^{-1} Y \quad (5)$$

It can be shown (see annexe) that expression (5) is equivalent to:

$$\hat{D}=(A^H A + \sigma_b^2 \cdot I_N)^{-1} A^H Y \quad (6)$$

When the system is not under full load equations (5) and (6) are reduced respectively to:

$$\hat{D}'=A'^H(A'A'^H + \sigma_b^2 \cdot I_N)^{-1} Y \quad (5')$$

$$\hat{D}'=(A'^H A' + \sigma_b^2 \cdot I_P)^{-1} A'^H Y \quad (6')$$

It will be noted that equation (6') involves the matrix $A'^H A'$ of reduced size P×P whilst equation (5') involves the matrix $A'A'^H$ of size N×N.

The idea at the basis of the invention is to estimate the transmission levels in a preliminary step by means of a single user detection method and then to use these levels for the GMMSE equalisation.

Figure 4:
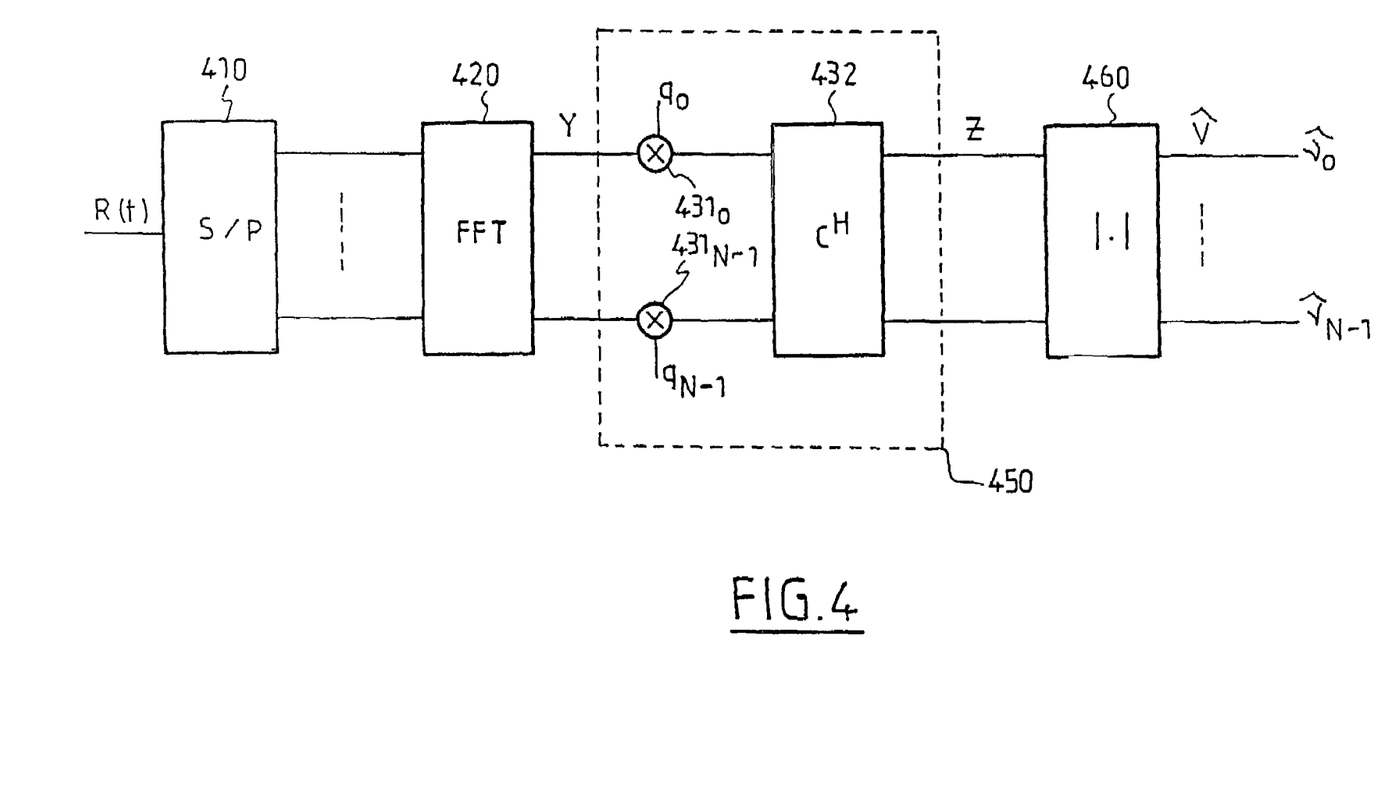
FIG. 4 depicts schematically a transmission level estimator useful to the equalisation device according to the invention.

The single user detection as disclosed above in relation to FIG. 2 makes it possible to obtain a first approximation of the relative transmission level of each user, ignoring inter-user interference. To do this, there is applied, at the output of the FFT module, as indicated in FIG. 4, a carrier to carrier equalisation by means of the multipliers $431_0, \ldots, 431_{N-1}$, and then at 432 the signals are despread by means of the sequences of the different users, in order to obtain a symbol vector $Z=(z_0, \ldots, z_{N-1})^T$, that is to say:

$$Z=C^H QY \quad (7)$$

where $Q=\mathrm{Diag}(q_0, \ldots, q_{N-1})$ where the $q_i$ values are coefficients of the chosen equalisation method MRC, EGC, ZF, MMSE. The combination of the equalisation module and despreading module is represented by 450. The operation performed at 450 is therefore a multiplication by the matrix $C^H Q$ and its output is the vector Z.

It will be noted that, if the equalisation method adopted is the MRC method, expression (7) is then written:

$$Z=C^H H^H Y \quad (8)$$

An estimation of the relative transmission levels in the module 460 is obtained in the form of a vector $\hat{v}=(\hat{v}_0, \ldots, \hat{v}_{N-1})^T$ such that:

$$\hat{v}_i = \sqrt{|z_i|^2} = |z_i| \quad (9)$$

if the interference and noise are ignored, and $$\hat{v}_i = \sqrt{|z_i|^2 - \hat{\lambda}^2} \quad (10)$$

if an estimation $\hat{\lambda}^2$ of the power of the interference and noise is available.

Advantageously, if several MC-CDMA symbols have been transmitted with the same codes and the same powers (for example within the same symbol frame), the module 460 can effect a smoothing of the values $\hat{v}_i$ or $\hat{v}_i^2$ by means of an FIR or IIR filter. In the latter case, no additional latency is introduced by the smoothing. If the output of the filter at time n is denoted $\tilde{v}_i(n)$:

$$\tilde{v}_i(n) = \alpha \tilde{v}_i(n-1) + \beta \hat{v}_i(n) \quad (11)$$

and where $\alpha$ and $\beta$ are the coefficients of the filter. For example $\alpha=0.9$ and $\beta=1-\alpha$ will be taken.

In all cases, once the relative transmission levels have been evaluated, the matrix A can be estimated by:

$$\hat{A}=HC\hat{V}$$

and therefore $$\hat{A}^H = \hat{V}^H C^H H^H \quad (12)$$

where $\hat{V}=\mathrm{Diag}(\hat{v}_0, \ldots, \hat{v}_{N-1})$.

It then suffices to replace A and $A^H$ in (5) or (6) by their respective estimates in order to obtain $\hat{D}$.

Advantageously, the detection will be effected by means of formula (6) and use will be made of the MRC equalisation method given by (8) in the preliminary single-user detection step. Thus the result of the carrier by carrier equalisation will be able to be reused in the GMMSE equalisation. This is because equation (6) can be written:

$$\hat{D}=(\hat{A}^H \hat{A} + \sigma_b^2 \cdot I_N)^{-1} \hat{A}^H Y = (\hat{A}^H \hat{A} + \sigma_b^2 \cdot I_N)^{-1}$$
$$\hat{V}^H C^H H^H Y = (\hat{A}^H \hat{A} + \sigma_b^2 \cdot I_N)^{-1} \hat{V}^H Z \quad (13)$$

The variance of the noise $\sigma_b^2$ can be evaluated for its part, in a conventional manner, by means of pilot signals serving for the estimation of the transmission channel. It is also possible to use a "typical" mean value.

The matrix $\hat{A}^H \hat{A}$ can also be rewritten in the form:

$$\hat{A}^H \hat{A} = \hat{V}^H (C^H H^H HC) \hat{V} = \hat{V}^H (C^H |H|^2 C) \hat{V} \quad (14)$$

It will be shown that, for the majority of the codes in normal use, the calculation of the matrix $B=C^H |H|^2 C$ can be considerably simplified.

Assume first of all that the code used is a Walsh-Hadamard (WH) code. It will be recalled that the WH code can be generated like the columns of a matrix $C_{2p}$ obtained by recurrence:

$$C_{2p} = \begin{bmatrix} C_p & C_p \\ C_p & -C_p \end{bmatrix} \text{ and } C_l = [1] \quad (15)$$

The matrix is real, symmetrical and equal to its own inverse. In addition, the sequences are orthogonal.

The elements of C can be expressed in the form: $c_{ij}=(-1)^{<i,j>}$ where $<i, j>$ is the scalar product of the binary representations of i and $$j: \langle i, j \rangle = \sum_k i_k j_k$$

The following property is derived therefrom:

$$c^*_{k,i} c_{k,j} = c_{k, i \oplus j} \quad (16)$$

where i⊕j represents the bitwise addition of the integers i and j.

This is because:

$$\sum_n i_n k_n + \sum_n j_n k_n = \sum_n (i_n + j_n) k_n = \sum_n (i \oplus j)_n k_n$$

and therefore $$\langle k, i \rangle + \langle k, j \rangle = \langle k, i \oplus j \rangle$$

The result of (16) is that the conjugate product of two WH codes is still a WH code.

Assume now that the codes used are Fourier codes, defined by:

$$c_{i,k} = \exp(-j\, 2\pi i k/N)$$

The matrix of the code is symmetrical.

$$c^*_{k,i} c_{k,j} = c_{k, j-i} \quad (17)$$

where "j-i" designates here the subtraction modulo N.

The result here too is that the combined product of two Fourier codes is still a Fourier code.

This property can be extended to a family of codes obtained by "rotation" of the previous codes (and for this reason referred to as rotated codes) as presented in the article by A. Bury et al. entitled "Diversity comparison of spreading transforms for multi-carrier spread spectrum transmission methods" published in Electronic Wireless 2000 Proceedings, Dresden, Germany. The matrix of a rotated code is defined by:

$$C^r = C \cdot D(r) \quad (18)$$

where D is a diagonal matrix defined by the vector $r=(r_0, \ldots, r_{N-1})^T$ that is to say $D = \text{Diag}(r_0, \ldots, r_{N-1})$ where $r_i = \exp(j\phi_i)$.

It can be shown that, if the matrix C of the initial code is such that the combined product of two codes is still a code or its conjugate then the matrix $C^r$ of the rotated code has the same property, to within a multiplying factor.

In general terms, the codes satisfying the following property will be considered:

$$c^*_{k,i} c_{k,j} = \lambda_{ij} \cdot c_{k, f(i,j)} \text{ or } \lambda_{ij} \cdot c^*_{k, f(i,j)} \text{ which will be denoted } \lambda_{ij} \cdot c_{k,}^{(*), f(i,j)} \quad (19)$$

where $f(i,j)$ is an index dependent on i and j and describing 0 to N-1 with i constant or with j constant and where $\lambda_{ij}$ is a complex number depending in general on the indices i and j.

In this case the coefficients $b_{ij}$ of the matrix $B = C^H |H|^2 C$ can be expressed by:

$$b_{ij} = \sum_{k=0}^{N-1} |h_k|^2 c^*_{k,i} c_{k,j} = \lambda_{i,j} \sum_{k=0}^{N-1} |h_k|^2 c^{(*)}_{k, f(i,j)} \quad (20)$$

First of all, for example, the first row of the matrix B is calculated, that is to say the coefficients $b_{0j}$, and then the other rows are derived therefrom by permutation:

$$b_{ij} = \frac{\lambda_{ij}}{\lambda_{o,j}} b_{0, f_o^{-1}(f(i,j))} \text{ where } f_0(k) = f(0, k) \quad (21)$$

If a table of $f_0^{-1} f$, and, where applicable, of $$\frac{\lambda_{ij}}{\lambda_{oj}},$$

is available, calculating the matrix B requires only the calculation of just one of its rows.

In general terms, if the code employed satisfies property (19), notably for a Hadamard, rotated Hadamard, Fourier or rotated Fourier code, a row of the matrix B will be calculated (or a column since it is hermitian) and the other rows (or respectively the other columns) will be derived therefrom by means of permutation and multiplication operations.

According to an advantageous embodiment of the invention, in the calculation of (5), (6), (13) or (14), account is taken only of the codes actually used (that is to say for the users present) and, amongst these, for a given user, only those significantly interfering with the code of this user.

Consider a user k. Formula (9) or (10) gives the estimation of the transmission levels $\hat{v} = (\hat{v}_1, \ldots, \hat{v}_{N-1})$.

The most interfering codes can be determined according to one of the following criteria:

(1) the P-1 (P a given integer such that P<N) codes $c_m$ distinct from $c_k$ associated with the highest $\hat{v}_m$ levels are selected;

(2) the codes $c_m$ distinct from $c_k$ associated with the levels $\hat{v}_m >$ Th are selected, where Th is a predetermined threshold. Advantageously, the threshold Th will be adaptive and will depend on the transmission level for the user in question. The codes $c_m$ will be selected such that: $\hat{v}_m > \mu \cdot \hat{v}_k$ with, for example, 0<μ<1. If the receiver of the user k uses several codes of indices $k_1, \ldots, k_A$, that is to say if the user has established several links with the base station (the channel of a user then consists of several links), account will be taken of the code of index $k_\delta \in \{k_1, \ldots, k_A\}$ associated with the lowest level $\hat{v}_{k\delta}$ and the codes $c_m$ will be selected such that: $\hat{v}_m > \mu \cdot \hat{v}_{k\delta}$. According to one variant, the absolute Th or relative μ threshold can be chosen as a function of the values of N (the length of the sequences) and P (the number of codes used). For example as a function of the ratio P/N, that is to say two levels of use of the resource, on which the interference depends after demodulation.

Naturally a combination of the above criteria can also be envisaged. In addition, as a complement to the selection from the transmission levels, it is possible to select, amongst those adopted according to this criterion, only the most intrinsically jamming codes (that is to say excluding any consideration of transmission level) for the code in question. This is because it is known, for example from the article by D. Mottier and D. Castelain entitled 'A spreading sequence allocation procedure for MC-CDMA transmission systems' published in VTC' Fall 2000, September 2000, included here by reference, that, if the coefficients $h_k$ of the channel are correlated, for a given user code, some codes (for an equal transmission level) are more jamming than others. More precisely, the interference between two codes $c_i$ and $c_j$ is related to the properties of the sequence "produced" $w_{ij}$, defined by $w_{ij}[k]=c_i[k]c_j^*[k]$. This selection criterion will be referred to hereinafter as the intrinsic jamming criterion.

With each code $c_i$ there is associated a set $E_j$ of codes judged to be "non-critical", that is to say weakly interfering. The size of these sets depends on the accepted interference level. It will be assumed that each set $E_i$ contains M elements.

According to one advantageous embodiment, the sets $E_i$ are stored in a bidimensional table: a first input corresponds to the index i of the code in question, a second input corresponds to the rank k (k between 0 and M-1) of the "non-critical" code. The output of the table gives the indices j of the codes, which are expressed by:

$$j=tab[i,k] \qquad (22)$$

In the case of the WH sequences, a table with one dimension suffices: it is possible to store only the sequences associated with the sequence 0. This is because $$w_{ij}[k] = c_{i \oplus j}[k] = w_{0, i \oplus j}$$

(the sequence produced corresponds to a code), if the term $\wp$ is given to the property related to the sequence produced making it possible to distinguish a code which has an intrinsically low propensity for jamming:

$E_i = \{j,$ such that $w_{ij} = c_i c_j^*$ satisfies the property $\wp\}$
$\Rightarrow \rightarrow E_i = \{j,$ such that $w_{0, i \oplus j} = c_0 c_{i \oplus j}$ satisfies the property $\wp\}$
$\Rightarrow \rightarrow E_i = \{k \oplus i; w_{0,k} = c_0 c_k^*$ satisfies the property $\wp\}$
$\Rightarrow \rightarrow E_i = \{k \oplus i; k \in E_0\} = i \oplus E_0$ It is therefore possible to generate the indices of the associated codes of $E_i$ from those of $E_0$ by:

$$j = i \oplus tab[0, k] \qquad (23)$$

This property can be extended to any code satisfying property (19). Equation (23) then becomes:

$$j = f_i^{-1}(tab[0, f_0(k)]) \text{ where } f_i(j) = f(i,j) \qquad (24)$$

Where the functions $f_i^{-1}$ have a simple form, a table with only one dimension suffices to generate the sets of non-critical codes. In particular these properties apply to a rotated Hadamard code, to a Fourier code or to a rotated Fourier code.

The intrinsic jamming criterion consists, for a given user k, of eliminating the codes relating to the indices belonging to $E_k$ and selecting the codes relating to the remaining indices.

It should be noted that the selection according to the intrinsic jamming criterion can take place before or after the selection according to the transmission level criterion.

The selection of the codes according to the transmission level criterion in possible combination with the intrinsic jamming criterion makes it possible both to improve the performance and to reduce complexity, whilst decreasing the size of the matrices.

Concerning the improvement to performance, it should be noted in fact that the codes which are not used can correspond to estimations $\hat{v}_i$ of low, but not zero, values, which may interfere with decoding. On the other hand, if a code used is eliminated whose transmitted level is low, the performance will be only very slightly degraded.

Concerning the reduction in the size of the matrices, if P codes have finally been selected it is possible to construct a matrix $\hat{V}'$ of size P×P obtained from $\hat{V}$ by eliminating the elements relating to the non-selected codes. It can be assumed, without loss of generality, that these codes bear the indices 0, ... P-1, and hence $\hat{V}'=Diag(\hat{v}_0, \ldots, \hat{v}_{P-1})$.

The symbols transmitted for the different users will then advantageously be estimated using the reduced equations (5') or (6').

Two cases are presented depending on whether or not the preliminary step of estimating the levels by single user detection has used an MRC equalisation.

If the preliminary step has not used an MRC equalisation, V is replaced by $\hat{V}'$ in the expression of matrices A and $A^H A$, which gives reduced versions $\hat{A}'$ and $\hat{A}'^H \hat{A}'$. The reduced matrix $\hat{A}'$ is simply obtained by the expression $\hat{A}'=HC'\hat{V}'$ where C' is the matrix reduced to the P selected codes. The symbols are then estimated by:

$$\hat{D}'=(\hat{A}'^H \hat{A}'+\sigma_b^2 \cdot I_P)^{-1} \hat{A}'^H Y \qquad (25)$$

If, on the other hand, the preliminary step has used an MRC equalisation, that is to say if the vector $Z=C^H H^H Y$ is already available as indicated at (8), it is possible to create a vector of reduced size, Z' containing only the components corresponding to the selected codes, here the first P components. The symbols are then estimated in a similar manner to (13):

$$\hat{D}'=(\hat{A}'^H \hat{A}'+\sigma_b^2 \cdot I_P)^{-1} \hat{V}'^H Z' \qquad (26)$$

In both cases, it is important to note that the inversion of the matrix (or the resolution of a linear system) relates to a matrix of size P rather than to a matrix of size N.

Figure 5:
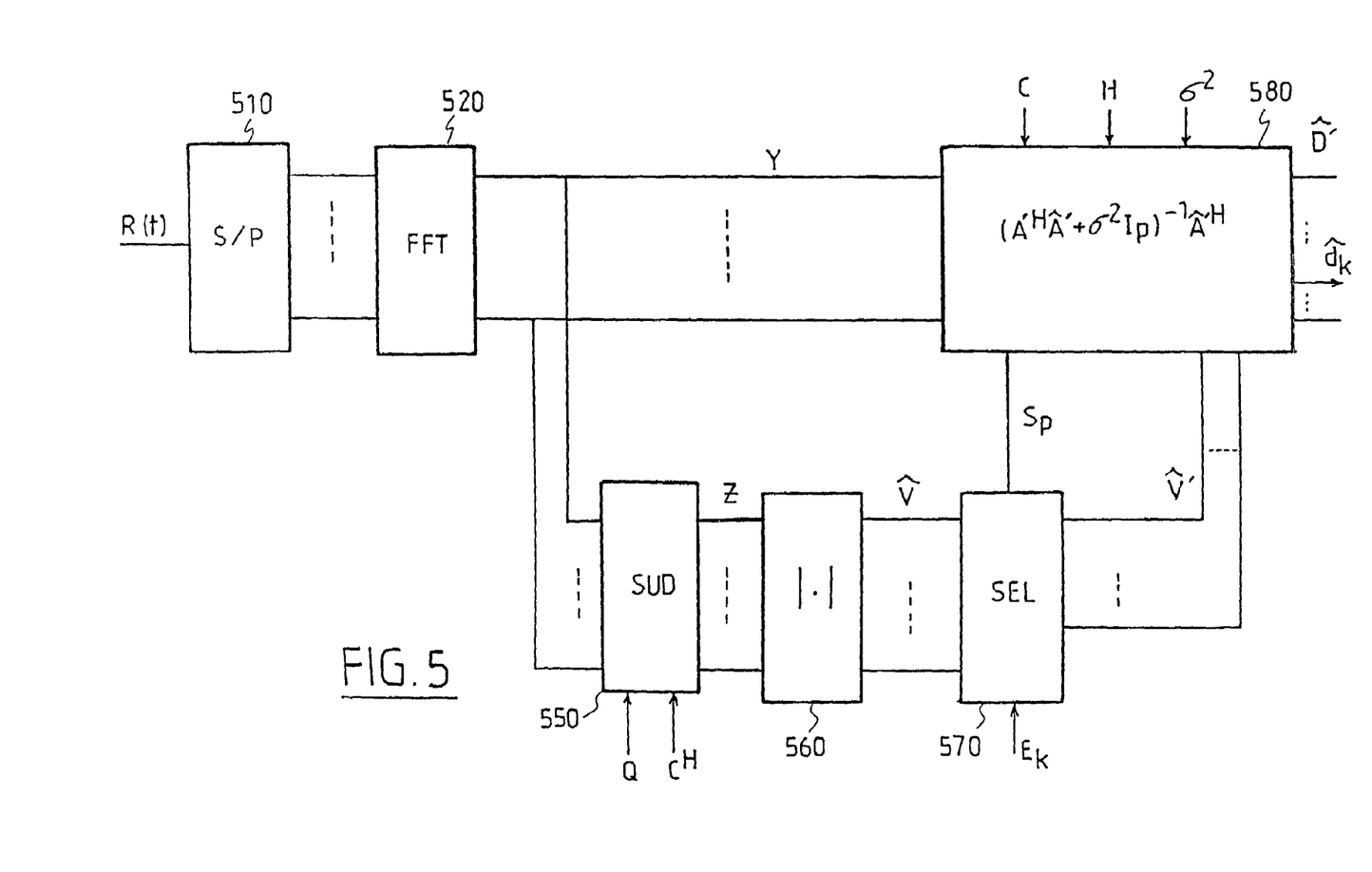
FIG. 5 depicts schematically the structure of an MC-CDMA receiver using a GMMSE equalisation according to a first embodiment of the invention.

FIG. 5 depicts an MC-CDMA reception device using the GMMSE equalisation method according to a first embodiment of the invention and implementing an estimation of the symbols according to (25).

The modules 510, 520, 550 and 560 are identical to the modules 410, 420, 450 and 460 in FIG. 4. The module 570 makes a selection of the codes according to the transmission level and/or intrinsic jamming criterion. The set $S_P$ of the indices of the selected codes is transmitted to the matrix calculation module 580 as well as the vector $\hat{v}'=(\hat{v}_1, \ldots, \hat{v}_{P-1})$ of the corresponding transmission levels. The matrix calculation module 580 also receives the values of C, H, $\sigma^2$, evaluates the matrix $\hat{A}'$ and then $\hat{A}'^H \hat{A}'$ as will be seen below and finally calculates $\hat{D}'$ according to (25). In practice, this calculation will be made by resolving the system of P linear equations with P unknowns $\hat{d}_k$:

$$(\hat{A}'^H \hat{A}'+\sigma_b^2 \cdot I_P)\hat{D}'=\hat{A}'^H Y \qquad (27)$$

At the output of 580, only the value $\hat{d}_k$ corresponding to the code of the user in question is actually used. If the user has established several links with the base station, the set of corresponding values $\hat{d}_k$ will be retained.

Figure 6:
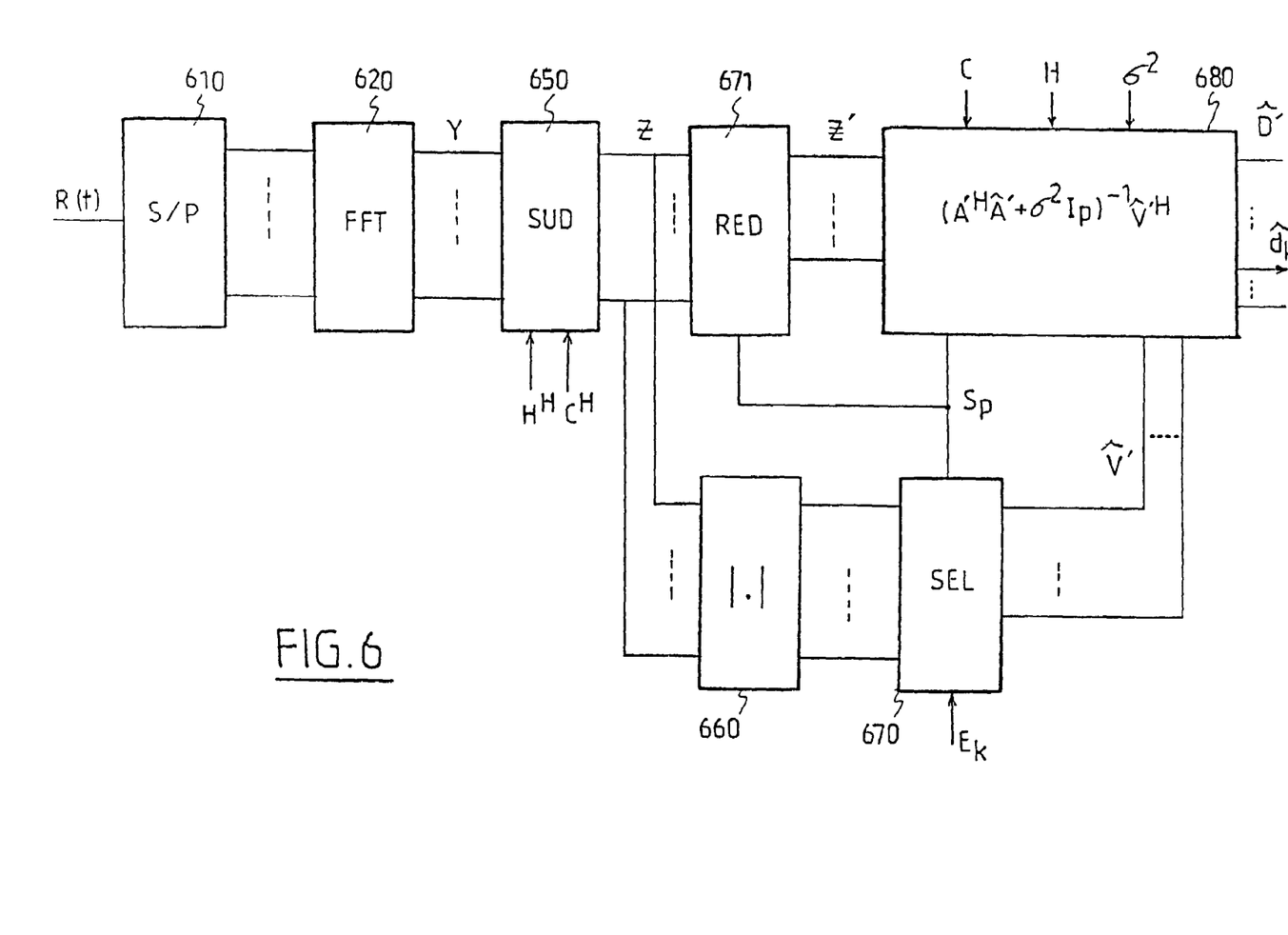
FIG. 6 depicts schematically the structure of an MC-CDMA receiver using a GMMSE equalisation according to a second embodiment of the invention.

FIG. 6 shows an MC-CDMA reception device using the GMMSE equalisation method according to a second embodiment of the invention and implementing an estimation of the symbols according to (26). The modules 610, 620, 650, 660, 670 are identical to the modules 510, 520, 550, 560 and 570 of FIG. 5. Unlike FIG. 5, however, the single user detection module 550 is here situated in the main detection flow. It effects an equalisation according to the MRC method followed by despreading, or, in other words, a filtering operation adapted to the transmission channel and to the codes of the different users. The set $S_P$ of selected indices is used by the module 671, which reduces the vector Z to the vector Z' of the components corresponding to these indices. The module 680 receives the vector Z', the values of C, H, $\sigma^2$, evaluates the matrix A' and then $\hat{A}'^H \hat{A}'$ as will be seen below and finally calculates $\hat{D}'$ according to (26). In practice, this calculation will be made by resolving the system of P linear equations with P unknowns $\hat{d}_k$:

$$(\hat{A}'^H \hat{A}' + \sigma_b^2 \cdot I_P)\hat{D}' = \hat{V}'^H Z' \qquad (28)$$

As before, at the output of 680, only the value or values $\hat{d}_k$ relating to the code or codes of the user will be retained.

It should be noted that, in the reception device of FIG. 5 or that of FIG. 6, the components of the vector $\hat{D}'$ can serve for an estimation of finer levels than that obtained from the single user detection. In this case, the new vector of the estimated levels can be used for a new calculation of $\hat{D}'$ or for a calculation of a vector of symbols at a subsequent time. To do this, the output of 580 (or respectively 680) is looped back onto the module 560 (or respectively 660).

In addition, the equalisation device according to the invention can make provision for changing dynamically from one equalisation method to another according to the characteristics of the channel or the occupation rate of the resource P/N. For example, the EGC method will be preferred to the MRC method if the occupation rate P/N is greater than a certain predetermined threshold. The reception device then changes from the configuration in FIG. 6 to that in FIG. 5 and vice-versa. Naturally, the switching can take place only at the start of a detection cycle, so as to ensure the consistency of the calculations.

As seen above, the modules 580 and 680 first of all evaluate the matrix $\hat{A}'$ by $\hat{A}' = HC'\hat{V}'$. A first expression of $\hat{A}'^H \hat{A}'$ is derived therefrom:

$$\hat{A}'^H \hat{A}' = \hat{V}'^H (C'^H |H|^2 C')\hat{V}' \qquad (29)$$

If it is observed that $\hat{A}'$ can also be written $\hat{A}' = (HC)'\hat{V}'$ where $(HC)'$ is the reduction of the matrix HC to its first P columns. A second expression of $\hat{A}'^H \hat{A}'$ is derived therefrom:

$$\hat{A}'^H \hat{A}' = \hat{V}'^H (C^H H^H)'(HC)'\hat{V}' = \hat{V}'^H (C^H |H|^2 C)'\hat{V}' \qquad (30)$$

It will be noted that, according to this second expression, a calculation of $C^H |H|^2 C$ on the complete matrix C is first of all effected before proceeding with a reduction in dimension.

When the number of codes P is low, the calculation of $\hat{A}'^H \hat{A}'$ according to formula (29) will be opted for. This calculation leads to approximately $(NP^2 + 2P^2 + NP)$ operations.

If on the other hand the reduction in the number of codes is not very high, the calculation according to formula (30) will be opted for, since there exists a fast algorithm for applying the transform C. This calculation is all the more simple since, in the majority of cases, the codes of the matrix C satisfy property (19). The elements of $B = C^H |H|^2 C$ can then be obtained by (20) and (21). As indicated above, only the calculation of one row (or one column) is effected, the other rows (or the other columns) being derived therefrom by permutation of the elements. If use is made for example of a WH code, the first row of the matrix B is obtained by a Hadamard transform of the vector $\rho = (|h_0|^2, \ldots, |h_{N-1}|^2)^T$ requiring $(N \log_2(N))$ operations. The complete calculation of $\hat{A}'^H \hat{A}'$ requires $(N \log_2(N) + 2P^2)$ operations. This operation will therefore be more effective as soon as $\log_2(N)$ is smaller than $P^2$. The modules 580 and 680 can change dynamically from the calculation according to (29) to the calculation according to (30) and vice-versa.

Although the MC-CDMA reception device using the equalisation method according to the invention has been depicted in the form of functional modules, it goes without saying that all or part of this device can be implemented by means of a single processor either dedicated or programmed for fulfilling all the functions described or in the form of a plurality of processors either dedicated or programmed for each fulfilling some of the said functions.

Annexe:

Let $Y = AD + b$ be an observable from which it is possible to estimate the vector D by Wiener filtering. A is a square matrix of size N×N. The vector $\hat{D}$ of the estimated symbols for the different users is obtained by means of the Wiener-Hopf equation:

$$\hat{D} = R_{DY} R_{YY}^{-1} Y = (R_{DD} A^H)(A R_{DD} A^H + \sigma_b^2 \cdot I_N)^{-1} Y$$

where $R_{DY}$, $R_{YY}$, $R_{DD}$ are respectively the covariance matrix of Y and D and the autocovariance matrices of Y and D. If it is assumed that the transmitted symbols are decorrelated, this gives $R_{DD} = I_N$ and therefore:

$$\hat{D} = A^H (AA^H + \sigma_b^2 \cdot I_N)^{-1} Y$$

Let $X = A^H Y$, the result of the matched filtering of Y: it is known that X is an exhaustive summary of Y. It is possible to take as an observable the vector X instead of the vector Y and estimate the vector D from this new observable by means of a Wiener filtering. The estimated vector $\hat{D}$ is then written:

$$\hat{D} = R_{DX} R_{XX}^{-1} X$$

However $R_{DX} = E(DX^H) = E(DY^H A) = (R_{DD} A^H + R_{Db})$
$A = A^H A$ and likewise $R_{XX} = A^H A R_{DD} A^H A + A^H R_{bb} A = (AA^H + \sigma_b^2 I_N) A^H A$ and hence $$\hat{D} = (A^H A + \sigma_b^2 I_n)^{-1} X = (A^H A + \sigma_b^2 I_n)^{-1} A^H Y$$

If the square matrix A is replaced by a rectangular matrix A' of size N×P, there is obtained, in the same way:

$$\hat{D} = (A'^H A' + \sigma_b^2 I_P)^{-1} X = (A'^H A' + \sigma_b^2 I_P)^{-1} A'^H Y$$

The invention claimed is:

1. An equalisation method for a downlink channel in an MC-CDMA telecommunication system, comprising steps of:
   establishing a plurality of links between a transmitter and a plurality of receivers, each link using a signal having a distinct access code amongst N codes transmitted by the transmitter and including MC-CDMA symbols;
   estimating relative power levels of the signals transmitted by the transmitter;
   selecting from the N codes, for a receiver, a subset of P codes that most interfere with a distinct access code of the receiver;
   equalizing the MC-CDMA symbols carrier by carrier; and
   estimating the equalized MC-CDMA symbols transmitted over at least one link based on the estimated relative power levels and the selected subset of P codes, the estimating the equalized MC-CDMA symbols further comprising minimizing a mean square error between the transmitted MC-CDMA symbols and the estimated symbols.

2. The method according to claim 1, wherein the equalizing is followed by a filtering adapted to each of the N possible codes to produce N filtered values.

3. The method according to claim 2, further comprising:
performing a modulus calculation on the N filtered values obtained by the filtering matched to each of the N possible codes; and
estimating the relative power levels based on a result of the modulus calculation.

4. The method according to claim 3, further comprising:
performing a time smoothing operation prior to or subsequently to performing the modulus calculation.

5. The method according to claim 4, wherein the estimating the MC-CDMA symbols includes calculating $$\hat{D}=(\hat{A}^H\hat{A}+\sigma_b^2 \cdot I_N)^{-1}\hat{A}^H Y$$

where $\hat{D}$ is a vector of the estimated symbols on the different links, Y is a received vector of the components of an MC-CDMA symbol on the different carriers, $\hat{A}=HC\hat{V}$ wherein H is a matrix including transmission channel characteristics at different carrier frequencies, C is a matrix of the N codes, $\hat{V}=\text{Diag}(\hat{v}_0,\ldots,\hat{v}_{N-1})$ where $(\hat{v}_i)$ values are estimated transmission levels, $\sigma_b^2$ is a variance of noise on each carrier and $I_N$ is a unity matrix of size N×N.

6. The method according to claim 5 further comprising:
calculating one row or one column of a matrix $B=C^H|H|^2 C$;
deriving other rows or columns of the matrix B from the calculated row or column based on a permutation of elements of B; and
obtaining the matrix $\hat{A}^H\hat{A}$ from B when the components of the matrix of the codes C satisfy $c^*_{k,i}c_{k,j}=\lambda_{ij}C_{k,f(i,j)}$ or $\lambda_{ij}c^*_{k,f(i,j)}$ where $\lambda_{ij}$ is a complex number and $f(i,j)$ is an index between 0 and N-1 dependent on i and j.

7. The method of claim 6, wherein the codes in C include at least one of a Walsh-Hadamard code, a rotated Walsh-Hadamard code, a Fourier code and a rotated Fourier code.

8. The method according to claim 2, wherein the equalizing includes a Maximum Ratio Combining (MRC) equalisation.

9. The method according to claim 8, wherein the estimating the MC-CDMA symbols includes calculating $$\hat{D}=(\hat{A}^H\hat{A}+\sigma_b^2 \cdot I_N)^{-1}\hat{V}^H Z$$

where $\hat{D}$ is a vector of the symbols estimated on the different links, Z is a vector of the filtered values, $\hat{A}=HC\hat{V}$ wherein H is a matrix including transmission channel characteristics at different carrier frequencies, C is a matrix of the N codes, $\hat{V}=\text{Diag}(\hat{v}_0,\ldots,\hat{v}_{N-1})$ where $(\hat{v}_i)$ values are estimated transmission levels, $\sigma_b^2$ is a variance of noise on each carrier and $I_N$ is a unity matrix of size N×N.

10. The method according to claim 1, further comprising:
selecting a subset of codes amongst the N possible codes is from the N estimated levels.

11. The method according to claim 10, wherein the selecting further comprises retaining, amongst the N estimated levels, those which exceed a predetermined threshold value Th.

12. The method according to claim 11, further comprising:
determining the threshold value Th based on a ratio between a number of codes actually used and a number N of possible codes.

13. The method according to claim 10, further comprising:

selecting the codes $c_m$ associated with transmission levels $\hat{v}_m$ such that $\hat{v}_m > \mu \cdot \hat{v}_k$ with $0<\mu<1$ for a link k using a code $c_k$ and having a transmission level $\hat{v}_k$.

14. The method according to claim 13, further comprising:
determining $\mu$ based on a ratio between a number of codes actually used and a number N of possible codes.

15. The method according to claim 10, further comprising:
selecting codes $c_i$ having a greatest ability to jam a link k using a code $c_k$.

16. The method according to claim 15, further comprising:
obtaining the codes $c_i$ with the greatest ability to jam the codes $c_k$ from a property of the sequence defined by $w_{ik}[l]=c_{li} \cdot c^*_{lk}$ where $c_{li}$ and $c_{lk}$ are sequences associated with the codes $c_i$ and $c_k$ respectively.

17. The method according to claim 16, further comprising:
obtaining the codes $c_i$ with the greatest ability to jam the codes $c_k$ from codes which most jam a predetermined code $c_0$; such that the codes $c_i$ and $c_k$ satisfy $c_{l,i} \cdot c^*_{l,k}= \lambda_{ik} c_{l,f(i,k)}$ or $\lambda_{ik} c^*_{l,f(i,k)}$ where $\lambda_{ik}$ is a complex number and $f(i,k)$ is an index which is a function of i and k.

18. The method according to according to claim 10, further comprising:
selecting P codes from the N codes; and
reducing a matrix $\hat{V}'$ of size P×P to include only levels associated with the selected codes, where $\hat{V}=\text{Diag}(\hat{v}_0,\ldots,\hat{v}_{N-1})$ and $\hat{v}_i$ values are the transmission levels estimated by the estimating relative levels,
wherein the estimating the MC-CDMA symbols further comprises calculating $$\hat{D}'=(\hat{A}'^H\hat{A}'+\sigma_b^2 \cdot I_P)^{-1}\hat{A}'^H Y$$

where $\hat{D}'$ is a vector of the estimated symbols on the links relating to the selected codes P, $\hat{A}'=HC'\hat{V}'$ where H is a matrix including transmission channel characteristics at different carrier frequencies, C' is a matrix of the P codes selected, Y is a vector of the components of an MC-CDMA symbol on the different carriers, $\sigma_b^2$ is a variance of noise on each carrier and $I_P$ is a unity matrix of size P×P.

19. The method according to claim 10, wherein the equalizing includes a Maximum Ratio Combining (MRC) equalisation.

20. The method according to claim 19, further comprising:
selecting P codes from the N codes; and
reducing a matrix $\hat{V}'$ of size P×P to include only levels associated with the selected codes, where $\hat{V}=\text{Diag}(\hat{v}_0,\ldots,\hat{v}_{N-1})$ and $\hat{v}_i$ values are the transmission levels estimated by the estimating relative levels,
wherein the estimating the MC-CDMA symbols further comprises calculating $$\hat{D}'=(\hat{A}'^H\hat{A}'+\sigma_b^2 \cdot I_P)^{-1}\hat{V}'^H Z'$$

where $\hat{A}'=HC'\hat{V}'$, H is a matrix including transmission channel characteristics at different carrier frequencies, C' is a matrix of the P codes selected, Z' is a vector of the filtered values reduced to the P codes selected, $\sigma_b^2$ is a variance of noise on each carrier and $I_P$ is a unity matrix of size P×P.

21. The method according to claim 20, further comprising:
determining a matrix product $C^H|H|^2 C$;
reducing the matrix product $C^H|H|^2 C$ to matrix product $(C^H|H|^2 C)'$ including only the selected codes; and obtaining the matrix $\hat{A}'^H \hat{A}'$ from matrix product $(C^H|H|^2 C)'$.

22. The method according to claim 18, further comprising:
  obtaining the matrix $\hat{A}'^H \hat{A}'$ from matrix product $C'^H|H|^2 C'$.

23. The method according to claim 22, further comprising:
  calculating one row or one column of the matrix $C^H|H|^2 C$; and
  deriving other rows or columns of the matrix $C^H|H|^2 C$ based on permutations of elements in the calculated row or column.

24. The method according to claim 23, further comprising:
  calculating the one row of the matrix $C^H|H|^2 C$ based on a Hadamard transform, wherein the matrix C includes a Hadamard matrix or a rotated Hadamard matrix.

25. The method according to claim 24, further comprising:
  obtaining the matrix $\hat{A}'^H \hat{A}'$ from a matrix product $C'^H|H|^2 C'$ when a number of selected codes is less than $\log_2(N)$; and
  obtaining the matrix $\hat{A}'^H \hat{A}'$ from the matrix product $(C^H|H|^2 C)'$ when a number of selected codes is greater than or equal to $\log_2(N)$.

26. The method according to claim 23, further comprising:
  calculating the one row of the matrix $C^H|H|^2 C$ based on a Fourier transform, wherein the matrix C includes a Fourier matrix or a rotated Fourier matrix.

27. An equalisation device for a MC-CDMA telecommunication system including a transmitter having a plurality of links to a plurality of receivers, each link using a signal having a distinct access code amongst N codes transmitted by the transmitter and including MC-CDMA symbols, said device comprising:
  a relative level estimating section configured to estimate relative power levels of the signals;
  a code selecting section configured to select from the N codes, for a receiver, a subset of P codes that most interfere with a distinct access code of the receiver;
  an equalizing section configured to equalize the MC-CDMA symbols carrier by carrier; and
  a MC-CDMA symbol estimating section configured to estimate the equalized MC-CDMA symbols transmitted over at least one link based on the estimated relative levels and the selected subset of P codes, the MC-CDMA symbol estimating section including a minimizing section configured to minimize a mean square error between the transmitted MC-CDMA symbols and the estimated symbols.

28. A receiver in a MC-CDMA teleconmiunication system including a transmitter and a plurality of links to the receiver and a plurality of other receivers, each link using a signal having a distinct access code amongst N transmitted by the transmitter codes and including MC-CDMA symbols, said receiver comprising an equalisation device, said equalisation device comprising:
  a relative level estimating section configured to estimate relative power levels of the signals;
  a code selecting section configured to select from the N codes a subset of P codes that most interfere with a distinct access code of the receiver;
  an equalizing section configured to equalize the MC-CDMA symbols carrier by carrier; and
  a MC-CDMA symbol estimating section configured to estimate the equalized MC-CDMA symbols transmitted over at least one link based on the estimated relative levels and the selected subset of P codes, the MC-CDMA symbol estimating section including a minimizing section configured to minimize a mean square error between the transmitted MC-CDMA symbols and the estimated symbols.

* * * * *